United States Patent [19]

Balmer et al.

[11] Patent Number: 4,820,925

[45] Date of Patent: Apr. 11, 1989

[54] ROOM AIR MONITOR FOR RADIOACTIVE AEROSOLS

[75] Inventors: David K. Balmer, Broomfield; William H. Tyree, Boulder, both of Colo.

[73] Assignee: The United States of America as represented by the United States Department of Energy, Washington, D.C.

[21] Appl. No.: 28,982

[22] Filed: Mar. 23, 1987

[51] Int. Cl.$^4$ .............................................. G01T 1/18
[52] U.S. Cl. ..................................... 250/379; 250/380
[58] Field of Search ..................... 250/379, 380, 435; 324/71.4

[56] References Cited

U.S. PATENT DOCUMENTS

| | | | |
|---|---|---|---|
| 3,614,442 | 10/1971 | Brodsky | 250/83.6 R |
| 3,878,496 | 4/1975 | Erickson | 250/336 |
| 3,988,587 | 10/1976 | Shreve, Jr. et al. | 250/364 |
| 4,092,539 | 5/1978 | Pao et al. | 250/336 |
| 4,286,155 | 8/1981 | Utting | 250/336 |
| 4,301,367 | 11/1981 | Hsu | 250/370 |
| 4,320,393 | 3/1982 | Engdahl | 340/600 |
| 4,336,532 | 6/1982 | Biehl et al. | 340/600 |
| 4,342,913 | 8/1982 | Shepherd | 250/380 |
| 4,415,237 | 11/1983 | Fox | 250/370 |
| 4,480,311 | 10/1984 | Mastain et al. | 364/527 |
| 4,489,315 | 12/1984 | Falk et al. | 340/600 |
| 4,536,841 | 8/1985 | Waechter et al. | 364/414 |
| 4,700,067 | 10/1987 | Carossi et al. | 250/380 |

OTHER PUBLICATIONS

Kordas, J. & Phelps, P., "An Online High Sensitivity Measurement System for Transuranic Aerosols", presented at the 23rd IEEE Nuclear Science Symposium, at New Orleans, LA, on Oct. 20–22, 1976 and published in the *IEEE Transactions on Nuclear Science*, vol. 24, No. 1, Feb. 1, 1977, pp. 670–672.

Kordas, J., & Phelps, P., "A Review of Monitoring Instruments for Transuranics in Fuel Fabrication and Reprocessing Plants: A Progress Report to the Physical and Technological Programs, Division of Biomedical and Environmental Research, U.S. Energy Research & Development Administration", Lawrence Livermore National Laboratory, Mar. 7, 1977, for unlimited distribution.

Kordas, J. & Phelps, P., "A Review of Measurement Techniques for Stack Monitoring of Long-Lived Alpha Emitters", Electronics Engineering Department & Environmental Sciences Division, Lawrence Livermore Laboratory, Nov. 1, 1978, presented the 25th IEEE Nuclear Science Symposium in Washington, DC, on Oct. 18–20, 1978 and published in *IEEE Transactions on Nuclear Science*, vol. 26, No. 1, Part 1, Feb. 1, 1979, pp. 757–764.

Kordas, J., "A Discussion of the Transuranic Aerosol Measurement System and Its Field Test Results", presented at a Workshop on Alpha Particulate Measurements in Effluent Streams and the Environment at Nuclear Facilities, Mar. 15–19, 1979, Germantown, MD presented at the 26th IEEE Nuclear Science Symposium and at the 11th Symposium on Nuclear Power Systems at San Francisco, CA, on Oct. 17–19, 1979, published in *IEEE Transactions on Nuclear Science*, vol. 27, No. 1, Feb. 1, 1980, pp. 742–746.

(List continued on next page.)

Primary Examiner—Janice A. Howell
Attorney, Agent, or Firm—Anne D. Daniel; James H. Chafin; Judson R. Hightower

[57] ABSTRACT

A housing assembly for use with a room air monitor for simultaneous collection and counting of suspended particles includes a casing containing a combination detector-preamplifier system at one end, a filter system at the other end, and an air flow system consisting of an air inlet formed in the casing between the detector-preamplifier system and the filter system and an air passageway extending from the air inlet through the casing and out the end opposite the detector-preamplifier combination. The filter system collects suspended particles transported directly through the housing by means of the air flow system, and these particles are detected and examined for radioactivity by the detector-preamplifier combination.

23 Claims, 2 Drawing Sheets

OTHER PUBLICATIONS

Yule, Thomas, J., "Collection Efficiencies as a Function of Aerosol Size for Commercial Alpha Air Monitors", presented at the 24th Health Physics Society Annual Meeting, Philadelphia, PA, Jul. 8–13, 1979, published in *Journal of Health Physics Society*, vol. 37, No. 6, Dec. 1979, pp. 824–825.

"Model 442A Selective Alpha Monitor" by RADeCO Products by SAI Technology, Science Applications, Inc., an advertisement appearing in a catalog put out by RADeCO, the first distribution of which was made in approximately 1976.

"Model Alpha-5A", by Eberline, a division of Thermo Electron Corp. a catalog advertisement, the first distribution of which was made approximately Jan. 1982.

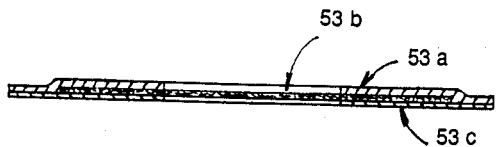
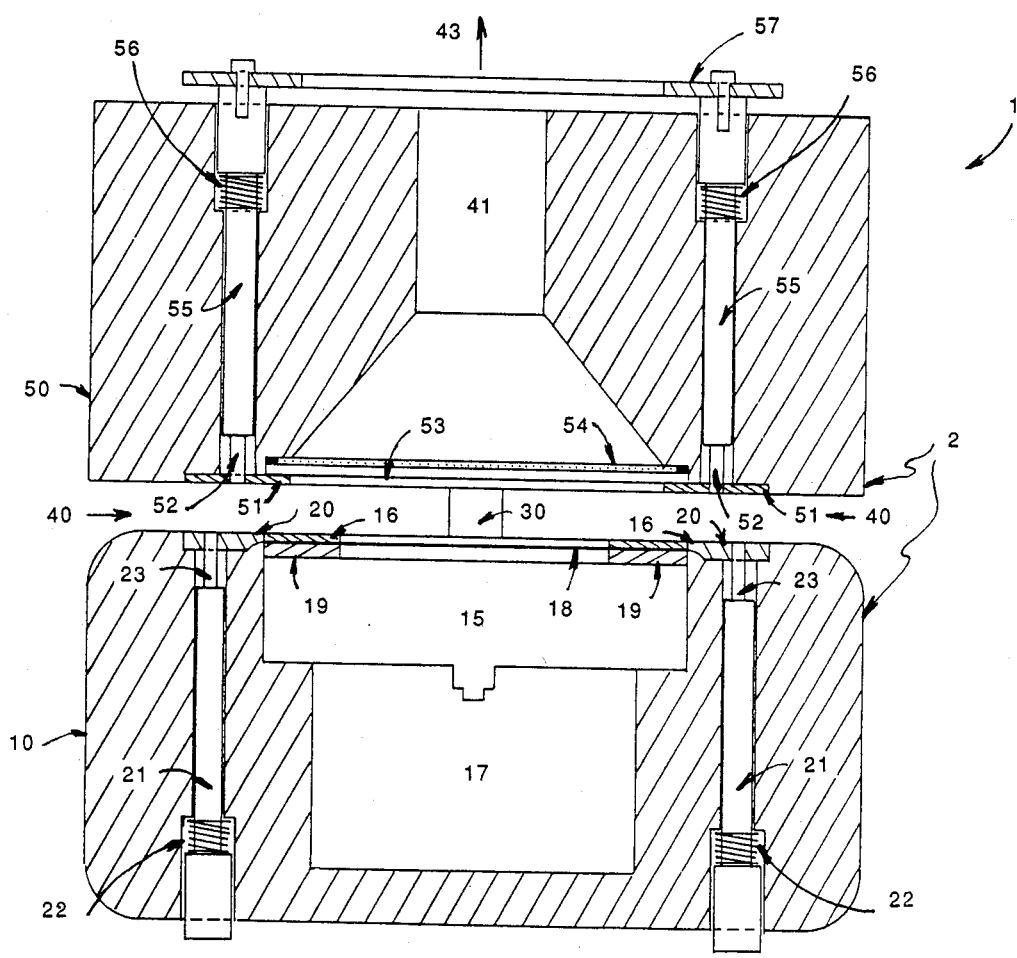
FIGURE 3
FIGURE 1

ROOM AIR MONITOR FOR RADIOACTIVE AEROSOLS

The U.S. Government has rights in this invention pursuant to Contract No. DE-AC04-76DP03533 between the Department of Energy and Rockwell International Corporation.

BACKGROUND OF THE INVENTION

The present invention relates generally to a filter-detector housing assembly for a room air monitor and, more particularly, to a close-coupled filter-detector fixture capable of collecting and detecting the presence of alpha particles emitted from radioactive material in room environment air.

Accurate and timely monitoring of the air quality is necessary for protection of workers in radioactive environments, specifically in industrial environments processing plutonium. Monitoring room air quality for radiation exposure must take into account not only the radiation quantity but also the radiation quality. For a device to measure accurately the radioactive aerosol concentrations contributing to worker exposure to unknown or varying spectra of alpha particle energies, the device not only should collect and count the events but also should distinguish between the alpha particle radiation emitted from the airborne plutonium and the naturally occurring alpha particle radiation from radon.

There is an existing need for a room air monitor with a filter-detector system capable of simultaneous and continuous collection and counting of long-lived radionuclides, primarily transuranic elements, typically in the form of suspended particulates.

Also, there is an existing need for a system capable of collecting and counting particulates present in room environment air for monitoring containment control system effectiveness.

Further, there is an existing need for an open frame sample collection and counting system which eliminates sampling tubes or lines where sample loss can occur.

Several devices are commonly used to monitor the room air quality of industrial environments. Existing monitoring instruments detect penetrating radiation without collection of the radioactive material itself. Some instruments are designed for detecting radioactive gases where a continuous sample stream is constrained in a detector assembly as opposed to being collected. These monitoring techniques are primarily designed to detect intermediate to long-range ionizing radiation.

Other instruments have been designed to collect and count radioactive material emitting short to intermediate range ionizing radiation; however, the sample collection and counting processes are separated both spatially and temporally. These devices suffer, in various degrees, the disadvantage that collection and counting are not performed continuously and/or simultaneously.

Other devices which perform both collection and counting, such as specific plutonium aerosol monitors, suffer a major disadvantage in that particles can be lost to the housing fixture due to the spatial arrangement of the collector and the detector, and the resulting air flow pattern. Distance, impeding surfaces, sampling tubes or lines, etc., between the collection and detection functions of a room air monitor lead to inaccuracy in the sample collected and diminished sensitivity.

Thus, none of the existing instruments are specifically configured to detect very short-range ionizing radiation, primarily alpha particles, and to measure long-lived radionuclides, primarily transuranic aerosols.

SUMMARY OF THE INVENTION

In view of the above-described needs, it is an object of this invention to provide a room air monitor capable of detecting very short-range ionizing radiation, and sensitive to long-lived radionuclides, particularly transuranic aerosols.

It is also an object of this invention to provide a room air monitor which performs sample collection and counting simultaneously and on a continuous basis.

It is another object of this invention to provide a room air monitor which includes an open frame sample collection and counting system in the form of a filter-detector fixture which allows direct flow of air to the filter media without any impeding surface, tubes, or lines where sample loss can occur.

It is a further object of this invention to provide a unique close-coupled filter-detector spatial arrangement &o produce a predictable response from the alpha particle radiation emitted from the deposited radioactive material, primarily airborne plutonium.

Additional objects, advantages, and novel features of the invention will become apparent to those skilled in the art upon examination of the following description or may be learned by the practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, there is provided a filter-detector housing assembly to be used in conjunction with a signal processor/counter. The assembly includes a radiation detector system at one end of the casing with an active surface facing the opposite end of the casing, a close-coupled filter system for collecting particulates in the room environment air with an active surface facing the detector system, and a direct air flow system with an inlet formed in the casing between the detector system and the filter system and an outlet at the end of the casing opposite the detector system. The direct air flow system includes an aperture traversing the casing from the inlet to the outlet. The formation of the air inlet adjacent to the filter housing eliminates sampling tubes and lines where sample loss has previously occurred and enables the accurate measurement of long-lived radionuclides or transuranic elements.

BRIEF DESCRIPTION OF THE DRAWINGS

The accompanying drawings, which are incorporated in and form part of the specification, illustrate an embodiment of the present invention and, together with the description, serve to explain the principles of the invention.

FIG. 1 is a plan view in cross-section of the filter-detector housing assembly.

FIG. 3 is a detail view of the filter cartridge.

DETAILED DESCRIPTION OF THE INVENTION

Figure 2:
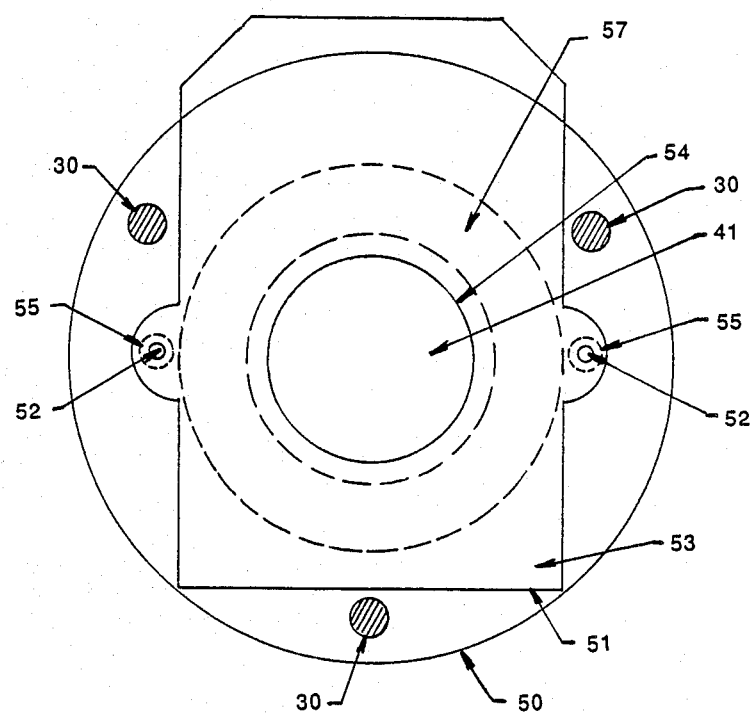
FIG. 2 is a cutaway view of the filter-detector housing assembly perpendicular to the axis of the casing and facing the filter end of the assembly.

As shown in the figures, one embodiment of filter-detector housing assembly 1 includes cylindrical casing 2 formed in two portions, a detector system portion 10 and a filter system portion 50, connected by three spacers 30, one of which appears in FIG. 1, with an annular air inlet 40 between the two portions.

A preferred embodiment of detector system 10 includes an acoustically insulated detector 15, a detector shielding system 16, and a preamplifier 17. The detector 15 used in the filter-detector fixture may preferably be a silicon ion implanted thin window particle detector, such as Ortec IP-1700-100-B, which is produced by a commercial vendor but has not previously been used in room air monitor technology. This detector provides an optimum combination of low noise, large area, simple construction, and lower capacity (good signal to noise performance). These features are major advantages of this invention because of the large quantity of instruments required for adequate building surveillance. In the illustrated embodiment, detector 15 is selected to provide the largest amount of radiation detected with the close-coupled filter-detector fixture. One detector used in the practice of the invention is Ortec IP-1700-100-B mounted in any acoustically insulating foam, such as one of the acoustical polyurethane foams (e.g. Soundcoat type "M" Soundfoam), having an active area of approximately 1700 mm$^2$. The large sensor provides an optimized detection area for intercepting alpha particles emitted from material impacted on filter media 53b, as described hereinafter. This area is larger than the area presented by the collecting particulate filter, which provides a spatial relationship or geometry for the radiation emitted in all directions from the particulates collected on the filter media that is at least 19–21%. Thus, at least 19–21% of all radiation emitted from the filter is sensed by the detector.

The detector shielding system 16 includes a disposable, thin Mylar (trademark) window 18 located in front of the solid state detector 15. Mylar is Du Pont's tradename denoting film composed of polyethylene glycol terephthalate, as defined in *Whittington's Dictionary of Plastics*, Second Edition, Technomic Publishing Co., Inc., 1978, page 209. Window 18 is mounted on a circular plastic supporting frame 19 and held in place by a spring-loaded retaining ring 20, which is in turn held in place by two clinch studs 23, located on opposite sides of the perimeter of the window retainer 20. The window 18 does not stop the radiation while it functions to protect detector 15 from material deposits and radioactive contamination. This protection reduces the need for cleaning and the possibility of damage that exists when the detector is being cleaned. Additionally, window 18 provides shielding against radiofrequency interference (RFI), visible light, and microphonic noise. The retainer 20 provides some tensioning of the material of the window 18 and allows the window to be replaced quickly.

Two plungers 21, fitted with springs 22 and located on opposed sides of the perimeter of window retainer 20, operate to release retainer 20. In response to manual pushing, plungers 21 contact clinch studs 23, which hold retainer 20 in place, and retainer 20 is moved outwardly to allow window 18 to be removed and replaced.

The preamplifier 17 is preferably a thick film hybrid preamplifier which provides a high degree of electronic durability and is most useful in applications using alpha particle detection with solid state detectors. The thick film hybrid preamplifier supplies an amplifying function at very low power at low input impedance; this is an advantage which makes it immune to external electrostatic voltages that can destroy field effect transistors normally used in these instruments and able to function in harsh electrical environments. In alternative embodiments, a typical field effect transistor (FET) preamplifier will be used. The FET preamplifier is more fragile but offers greater sensitivity to and is most useful in the detection of aerosols emitting radiations of lower ionizing potential, such as beta particles.

The airflow system consists of annular air inlet 40 located between the close-coupled detector system portion 10 and filter system portion 50, aperture 41 extending axially along the central axis of filter system portion 50, and air flow outlet 43 located at the opposite end of filter system portion 50 from annular air inlet 40. Inlet 40 extends radially from the cylindrical housing between the detector system portion 10 and filter system portion 50, perpendicular to aperture 41, allowing communication between the filter end and the detector end of the casing.

A preferred embodiment of filter system portion 50 includes filter cartridge 53, held in place by a filter retainer 51 located on the end of the filter system portion 50 next to the annular air inlet 40, and supported and braced by filter support screen 54 located on the opposite side of filter cartridge 53 from filter retainer 51. The filter retainer 51 is in turn held in place by two clinch studs 52 on opposed sides of retainer 51. Filter cartridge 53 is a laminate of three thin pieces held together by pressure adhesive, which includes a foam support 53a, a filter media 53b, and a cardboard frame 53c for the filter media 53b, which is shown in detail in FIG. 3. Filter support 53a provides, in effect, a separate sealing gasket for each sample collection and thus eliminates the need for air flow system gasket seal maintenance; filter media 53b collects the particulate sample from the passage of air through the air flow system; and the cardboard frame 53c allows color and bar code placement for quick change and normal handling without contacting the sample filter surface. Each of the two outside pieces 53a and 53c of the filter cartridge 53 have an identically sized and located circular open area to provide filter media 53b with an active surface area of 1350 mm$^2$ for collection of particulates.

Two plungers 55, fitted with springs 56 and attached to circular base 57, are located on opposing sides of filter system portion 50. Plungers 55 operate to release the filter retainer 51. In response to the manual pushing of plunger base 57, plungers 55 contact clinch studs 52 holding retainer 51 in place, and retainer 51 is moved outwardly to allow filter cartridge 53 to be removed and replaced. This design of the spring-plunger activated retainer 51 minimizes intrusion into air inlet 40, allowing closer spacing between the detector system portion 10 and the filter system portion 50 which results in higher effective sensitivity.

The basic operation of the invention is now apparent. In accordance with the invention, the housing assembly 1 holds the detector system portion 10 near the filter system portion 50 while allowing a free air path past spacers 30 into annular air inlet 40. A vacuum system (not shown) is coupled directly to outlet 43 by means of suitable hoses (not shown) for creating the necessary air flow. Air entering inlet 40 flows through the filter cartridge 53, passes along aperture 41, and exits from housing assembly 1 past plunger base 57 through outlet 43. Particulates that are present in room environment air are collected on the porous filter area 53b on a continuous basis. Window support screen 54 prevents the filter media 53b from being torn or destroyed by the air flow during the process. The radiation emitted by these particles collected on the filter media is detected by the radiation detector 15. Electronic signals developed and emitted by detector 15 in response to the detected radiation are amplified by preamplifier 17 for analysis by circuitry commonly known to those of ordinary skill in this art. Materials used in the housing assembly may be cast aluminum or bar stock aluminum, typically 6061-T6 aluminum alloy, except for the materials of various specific parts of the assembly as described below. It is contemplated that future assemblies will use die cast aluminum. In one embodiment of the invention, the diameter of the casing is approximately 105 mm and the length is 89 mm. The air inlet opening 40, which defines the distance between the filter system 50 and the detector system 10, is 7 mm. The diameter of the active surface of the collecting filter media 53b is 41 mm and is identical to the apertures of the outside pieces of the filter cartridge 53a and 53c, the filter support screen 54, and the filter retainer 51. Filter support screen 54 is 304 stainless steel wire cloth, 34×34 mesh, with 0.009 inch (0.229 mm) stainless steel wire and 0.020 inch (0.508 mm) openings. The filter cartridge laminate 53 is composed of 0.032 inch (0.813 mm) closed cell foam outside piece 53a, a 0.018 inch (0.457 mm) Hollingsworth and Vose LB-5211-A-0 filter media piece 53b, and 0.032 inch (0.813 mm) chipboard piece 53c. The plunger springs 22 and 56 are 0.020 inch (0.508 mm) spring steel, and window retainer 20 is 0.062 inch (1.575 mm) stainless steel. Window 18 is 0.00010 inch (0.00254 mm) Mylar or polyethylene glycol terephthalate sheet and is attached to plastic supporting frame 19 by pressure sensitive adhesive of 180° peel strength 25-40 oz. per inch (0.984-1.575 oz. per mm).

A prototype of this invention has been constructed and tested for performance. The sensitivity is based on the normal background which has been observed, the air flow through the filter media, the counting time, the alarm level selected, and the geometry obtained with the 1700 mm$^2$ detector 15. Test results yielded typical values for a detector geometry of 20% and for a background of 7 counts in 1.5 minutes. The selected operating parameters were: 3M$^3$/hr airflow and an alarm level of 16 counts in 1.5 minutes. The derived air concentration (DAC) allowed by regulation is 4.8 d/m/M$^3$ or 7.2 d/1.5 m/M$^3$ Under these conditions, the accumulation time for a mean alarm level is:

Based on geometry, the new instrument offers an improvement in sensitivity by a factor of 2 to 3 over previously available control instruments. Also, sample loss and particle distribution tests have confirmed that the new instrument eliminates errors due to sample collection that can be as high as 800% for previously available control instruments.

This filter-detector housing assembly forms a separate fixture of a room air monitoring system, which can be coupled directly to a vacuum system and which allows mounting of the detection-sampling head in areas adjacent to personnel work areas, thus minimizing the time required to produce a respirator warning alarm.

The room air monitor system may also include, in addition to the filter-detector fixture, the following: (1) background compensation features such as a counting circuitry which contains a difference counting scheme to compensate for changing radon levels present on the filter media, such as short-lived activity which may be present depending on the radon level detected, and selectable levels; (2) alarm capability including an alarm circuitry system which produces a high/low aural alarm when the alarm level is exceeded and internal switches for setting the alarm level; (3) 6-decade liquid crystal (LCD) displays to provide direct readout of the pulses obtained from the plutonium energy band and the pulses present in the radon compensation energy band; and (4) an internal battery which supplies continuous power (i.e. power when normal power is absent) and line voltage filtering. The above-described circuitry digitally compensates for the presence of interference from high energy radon activity and improves the overall sensitivity of the counting system to pulses which come from the radiation from plutonium impacted on the filter media. The circuitry may also include features to allow transmission of the alarm condition from the detector-alarm unit to the remote display and alarm system. Each pulse that fulfills the detection criteria of the plutonium energy band is transmitted to the remote display system. Optional alarms may be plugged in to add high power aural output and/or visual beacons.

The particular sizes and equipment discussed above are cited merely to illustrate a particular embodiment of the invention. It is contemplated that use of this invention may involve components having different sensitivities and sizes as long as the principle described herein is followed. A filter-detector housing assembly for a room air monitor, constructed in accordance with the present invention, will provide accurate and reliable collection and detection of radioactive particles suspended in room environment air. It is intended that the scope of the invention be defined by the claims appended hereto.

What is claimed is:

1. A housing assembly, for use in combination with a signal processor/counter for detecting suspended particles, comprising:
   a casing having opposed first and second ends and a central, longitudinal axis;
   detector means, adjacent to said first end and having an active surface facing said second end, for providing electronic signals representative of radiation detected by said active surface;
   a filter system, close coupled with said detector means and having a filter surface facing said active surface of said detector means, for collecting particulates in room environment air;
   an air flow system comprising an air inlet formed as an annular opening in said casing between said detector means and said filter system, said opening extending radially from said casing in communication with said filter surface, an air outlet adjacent to said second end of said housing assembly, and an aperture extending along said central, longitudinal axis of said casing from said air inlet to said air outlet.

2. A housing assembly, as claimed in claim 1, wherein said detector means includes a preamplifier means, located at said first end of said housing assembly, for amplifying electronic signals.

3. A housing assembly, as claimed in claim 1, wherein said active surface is a silicon thin window particle detector.

4. A housing assembly, as claimed in claim 3, wherein said active surface has an active area of about 1,700 mm$^2$.

5. A housing assembly, as claimed in claim 1, wherein said filter system is located at said filter end of said aperture.

6. A housing assembly, as claimed in claim 5, wherein said filter system comprises: a filter cartridge; means for retaining said filter cartridge against said filter end of said aperture; means for supporting and protecting said filter cartridge against air flow through said opening; and operable means for releasing said retaining means to permit removal and replacement of said filter cartridge.

7. A housing assembly, as claimed in claim 6, wherein said filter cartridge comprises: a laminate of a filter media sandwiched between a foam outer piece for providing a separate sealing gasket with said casing; and a cardboard outer piece.

8. A housing assembly, as claimed in claim 7, wherein said two outer pieces are each formed having a cartridge aperture, operably and axially aligned and in communication with said air flow system.

9. A housing assembly, as claimed in claim 7, wherein said filter media has a circular active area operably and axially aligned with said cartridge aperture.

10. A housing assembly, as claimed in claim 6, wherein said means for retaining said filter cartridge comprises plate means, having a shape and aperture conforming identically to said filter cartridge, for holding said filter cartridge in place and for masking and protecting said cardboard outer piece from contact with radioactive particles.

11. A housing assembly, as claimed in claim 6, wherein said means for supporting and protecting comprises a stainless steel plate having a screened aperture operably aligned with said cartridge aperture.

12. A housing assembly, as claimed in claim 6, wherein said means for releasing said retaining means comprises a plunger and spring means, located at said second end of said housing assembly, said plunger being operable to effect release of said filter cartridge from said filter system.

13. A housing assembly, as claimed in claim 1, further comprising a shielding system, located intermediate to said detector means and said filter system, for protecting said detector means.

14. A housing assembly, as claimed in claim 13, wherein said shielding system comprises a window, means for retaining and tensioning said window against said detector end of said aperture, and operable means for releasing said retaining means to permit removal and replacement of said window.

15. A housing assembly, as claimed in claim 14, wherein said window is composed of a thin, polyethylene glycol terephthalate material and a circular plastic frame.

16. A housing assembly, as claimed in claim 14, wherein said retaining and tensioning means comprises a spring-loaded retaining ring.

17. A housing assembly, as claimed in claim 14, wherein said releasing means comprises a plunger and spring means, located at said first end of said housing assembly, said plunger capable of being pushed to effect release of said window from said shielding system.

18. A housing assembly, for use in combination with a signal processor/counter for detecting suspended particles, comprising:
   a casing having opposed first and second ends and a central, longitudinal axis;
   detector means, adjacent to said first end and having an active surface facing said second end, for providing electronic signals representative of radiation detected by said active surface;
   filter means, close coupled with said detector means and having a filter surface facing said active surface of said detector means, for collecting particulates in room environment air, said filter means comprising
      (1) a filter cartridge formed of a laminate of a filter media sandwiched between a foam outerpiece for providing a separate sealing gasket with said casing and a cardboard outerpiece for providing support,
      (2) means for retaining said filter cartridge in said casing,
      (3) means for supporting and protecting said filter cartridge, and
      (4) operable means for releasing said retaining means to permit removal and replacement of said filter cartridge;
   an air flow system comprising an air inlet formed as an annular opening in said casing between said detector means and said filter system, said opening extending radially from said casing in communication with said filter surface, an air outlet adjacent to said second end of said housing assembly, and an aperture extending along said central, longitudinal axis of said casing from said air inlet to said air outlet.

19. A housing assembly, as claimed in claim 18, wherein said two outer pieces of said filter cartridge are each formed having a cartridge aperture, operably and axially aligned and in communication with said air flow system.

20. A housing assembly, as claimed in claim 18, wherein said filter media has a circular active area operably and axially aligned with said cartridge aperture.

21. A housing assembly, as claimed in claim 18, wherein said means for retaining said filter cartridge comprises plate means, having a shape and aperture conforming identically to said filter cartridge, for holding said filter cartridge in place and for masking and protecting said cardboard outer piece from contact with radioactive particles.

22. A housing assembly, as claimed in claim 18, wherein said means for supporting and protecting comprises a stainless steel plate having a screened aperture operably aligned with said cartridge aperture.

23. A housing assembly, as claimed in claim 18, wherein aid means for releasing said retaining means comprises a plunger and spring means, located at said second end of said housing assembly, said plunger being operable to effect release of said filter cartridge from said filter system.

* * * * *